United States Patent
Lee et al.

(10) Patent No.: US 6,671,022 B1
(45) Date of Patent: Dec. 30, 2003

(54) MULTI-DOMAIN LIQUID CRYSTAL DISPLAY DEVICE

(75) Inventors: Joun Ho Lee, Daeku-shi (KR); Doo Hyun Ko, Kumi-shi (KR)

(73) Assignee: LG.Philips LCD Co., Ltd., Seoul (KR)

( * ) Notice: Subject to any disclaimer, the term of this patent is extended or adjusted under 35 U.S.C. 154(b) by 39 days.

(21) Appl. No.: 09/629,793

(22) Filed: Jul. 31, 2000

(30) Foreign Application Priority Data

Jul. 31, 1999 (KR) ........................................ 1999-31567

(51) Int. Cl.$^7$ ............................................ G02F 1/1337
(52) U.S. Cl. .......................... 349/141; 349/39; 349/43; 349/142; 349/143
(58) Field of Search ............................. 349/43, 39, 54, 349/141, 142, 143

(56) References Cited

U.S. PATENT DOCUMENTS

| | | | |
|---|---|---|---|
| 4,581,608 A | 4/1986 | Aftergut et al. | 340/704 |
| 4,728,175 A | 3/1988 | Baron | 350/336 |
| 4,937,566 A | 6/1990 | Clerc | 340/784 |
| 4,978,203 A | 12/1990 | Yamazaki et al. | 350/339 |
| 5,574,582 A | 11/1996 | Takeda et al. | 359/59 |
| 5,668,650 A | 9/1997 | Mori et al. | 349/42 |
| 5,694,185 A | 12/1997 | Oh | 349/46 |
| 5,737,051 A | 4/1998 | Kondo et al. | 349/141 |
| 5,777,701 A | 7/1998 | Zhang | 349/44 |
| 5,831,708 A * | 11/1998 | Hiraishi et al. | 349/143 |
| 5,936,693 A * | 8/1999 | Yoshida et al. | 349/139 |
| 6,137,554 A * | 10/2000 | Nakamura | 349/75 |

FOREIGN PATENT DOCUMENTS

| | | |
|---|---|---|
| EP | 0 752 611 | 1/1997 |
| EP | 0 814 142 | 12/1997 |
| EP | 0 854 377 | 7/1998 |
| GB | 2 296 810 | 7/1996 |
| GB | 2 321 718 | 8/1998 |
| GB | 2 337 843 | 1/1999 |
| GB | 2887843 A * | 12/1999 |
| JP | 403141325 * | 6/1991 |
| JP | 05-297412 | 11/1993 |
| JP | 09-197420 | 7/1997 |
| JP | 09-230387 | 9/1997 |

* cited by examiner

*Primary Examiner*—Toan Ton
(74) *Attorney, Agent, or Firm*—McKenna Long & Aldridge LLP (57) ABSTRACT

A multi-domain liquid crystal display device that is capable of forming a multi-domain by using a gate line. In the device, a data signal is applied to the data line and a gate signal is applied to gate lines crossing the data lines. Switching devices are arranged at each intersection between the gate lines and the data lines and are connected to the pixel electrodes. Auxiliary electrode lines are extended vertically from the gate lines to control an orientation of the liquid crystal with the gate lines. Accordingly, the gate line is used as the auxiliary electrode line, so that an aperture ratio can be improved. Also, a resistance component is reduced, so that problems of the brightness non-uniformity and the generation of a flicker and a residual image, etc. caused by a voltage deviation can be overcome.

21 Claims, 9 Drawing Sheets

MULTI-DOMAIN LIQUID CRYSTAL DISPLAY DEVICE

BACKGROUND OF THE INVENTION

1. Field of the Invention

This invention relates to a liquid crystal display device, and more particularly to a multi-domain liquid crystal display device that is capable of forming a multi-domain using a gate line.

2. Description of the Related Art

Generally, a liquid crystal display (LCD) device controls a light transmissivity of liquid crystal cells in accordance with a video signal to display a picture. Such a LCD device has an advantage of small dimension, thin thickness and low power consumption while having a disadvantage of narrow view angle. An active matrix type LCD provided with a switching device for each liquid crystal cell is adaptive for displaying a moving picture. In the active matrix LCD, a thin film transistor (TFT) has been largely used as the switching device.

The active matrix LCD displays a picture corresponding to a video signal such as television signal on picture elements or pixels arranged at each intersection between gate lines and data lines. Each pixel includes a liquid crystal cell controlling a transmitted light amount in accordance with a voltage level of a data signal from the data line. The thin film transistors are formed at intersections between the gate lines and the data lines to switch a data signal to be transferred into the liquid crystal cell in response to a scanning signal from the gate lines.

Recently, there has been suggested a scheme of adjusting an orientation of the liquid crystal cells in a different direction at each of sub-pixels or domain divided into more than two within one pixel in order to compensate for a narrow view angle of the LCD. Such a LCD includes a multi-domain LCD device in which side electrode lines are provided around the pixel electrodes. This multi-domain LCD device drives a liquid crystal by the side electrodes insulated electrically from the pixel electrodes without orientating the liquid crystal cells.

Figure 1:
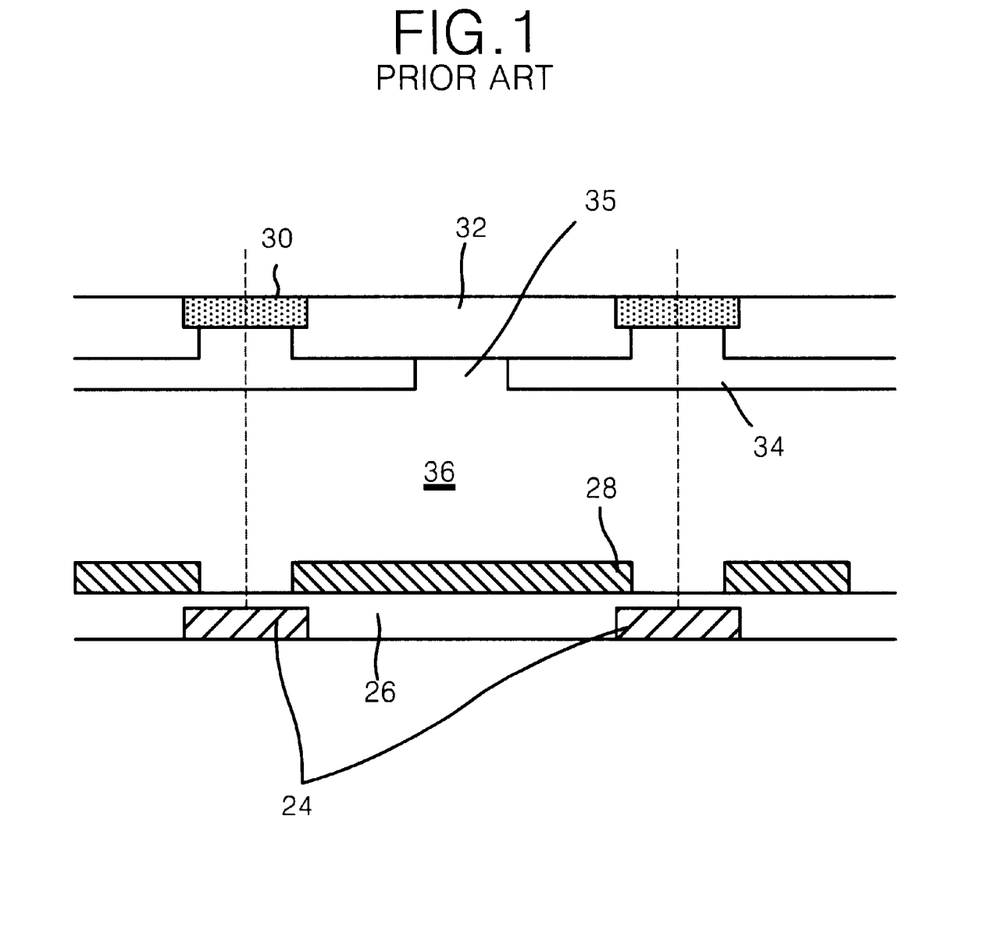
FIG. 1 is a plan view showing a structure of a conventional multi-domain liquid crystal display device.

FIG. 1 is a section view showing a structure of a unit pixel included in the conventional multi-domain LCD device. In FIG. 1, the unit pixel includes first and second substrates, a plurality of data lines and gate lines arranged horizontally and vertically on the first substrate to divide the first substrate into a plurality of pixel areas, and a thin film transistor at each pixel area on the first substrate. The thin film transistor (TFT) comprising of a gate electrode, a gate insulating film, a semiconductor layer, an ohmic contact layer and a source/drain electrode, a protective film 26 formed on the entire first substrate, a pixel electrode 28 provided on the protective film 26 to be connected to the drain electrode, and side electrodes 24 provided on the gate insulating film in such a manner to be overlapped with a portion of the pixel electrode 28. The unit pixel further includes a black matrix 30 provided on the second substrate to shut off a light leaked from the gate line, the data line and the thin film transistor, a color filter 32 provided between the black matrices 30 in correspondence with the pixel area, a common electrode 34 provided on the black matrix 30 and the color filter 32, and a liquid crystal layer 36 between the first and second substrates. The side electrodes 24 in the neighborhood of the pixel and an open area 35 of the common electrode 34 distort an electric field applied to the liquid crystal layer 36 to drive liquid crystal molecules diversely within the unit pixel. In other words, when a voltage is applied to the LCD device, a dielectric energy caused by the distorted electric field positions a liquid crystal director in a desired direction. In this case, the LCD device requires the open area 35 at the common electrode so as to obtain a multi-domain effect. A degree of the electrical field distortion required for a domain division is weak when the open area 35 does not exist in the common electrode 34 or when a width of the open area is small, a time when the liquid crystal director arrives at a stable state is relatively lengthened.

In the LCD device, however, because the side electrodes 24 taking a shape of surrounding the circumference of the pixel electrode 28 are used, an aperture ratio proportional to a size of the pixel electrode 28 is reduced. Accordingly, a brightness of the LCD device is deteriorated. Also, in FIG. 1, the side electrodes 24 are formed on the same layer as the data lines. In this case, the data lines are liable to be shorted to the side electrodes 24, and a line coupling in the data direction is generated, if shorted. In order to overcome this problem, it is necessary to assure a sufficient distance between the data line and the side electrode 24.

Accordingly, a size of the pixel electrode 28 goes smaller to further reduce an aperture ratio. In addition, the conventional side electrode 24 has a drawback in that, since it is formed in a line type and its width is set to have a value as small as possible (e.g., 6 $\mu$m) in consideration of an aperture ratio, that is, a size of the pixel electrode 26, it has a large resistance value. As a resistance value of the side electrode 24 is large, a voltage deviation caused by a resistance component thereof increases at the side electrode 24 when applied to a large-dimension panel. Particularly, a common voltage is applied to the side electrode 24 from each side of the panel, and a resistance value of the side electrode 24 is more and more increased to enlarge a voltage deviation as it goes toward the innermost side of the panel. Accordingly, as a potential difference between the pixel electrode 28 and the side electrode 24 is differentiated for each liquid crystal cell, the brightness becomes non-uniform and a flicker and a residual image, etc. are generated to thereby cause a deterioration of picture.

Figure 2:
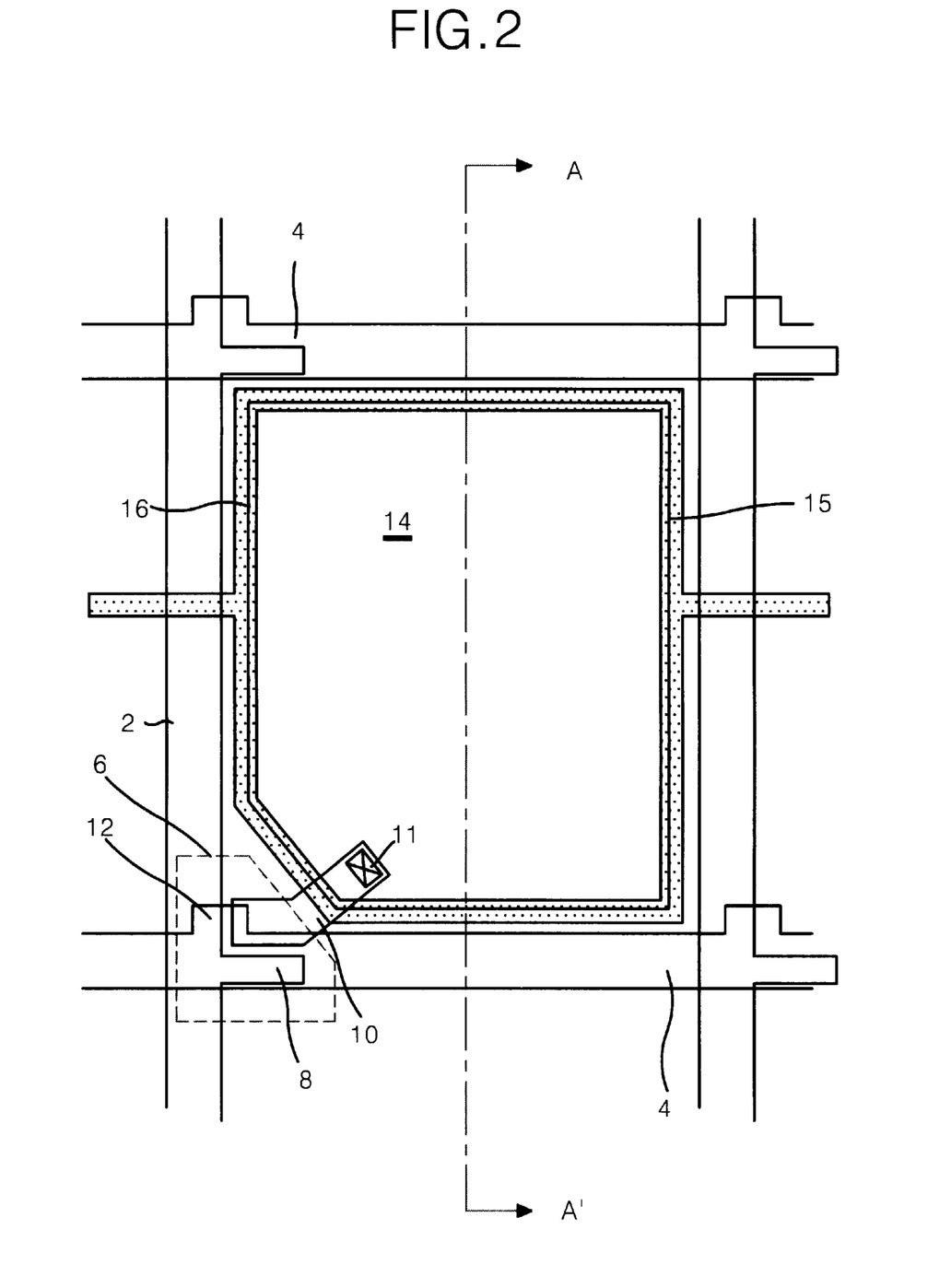
FIG. 2 is a plan view showing a structure of a multi-domain liquid crystal display device.

FIG. 2 is a section view showing the structure of a multi-domain LCD device disclosed in the pending Korea Application No. 99-05587 filed by the same applicant. In FIG. 2, the multi-domain LCD device includes thin film transistors (TFT's) 6 arranged at each intersection between data lines 2 and gate lines 4, pixel electrodes 14 connected to drain electrodes 10 of the TFT's 6, and auxiliary electrode lines 16 provided at the circumferences of the pixel electrodes 14. Each TFT 6 comprises a gate electrode 12 connected to the gate line 4, a source electrode 8 connected to the data line 2, and a drain electrode 10 connected, via a drain contact 11, to the pixel electrode 14. The TFT 6 further includes a semiconductor (not shown) for providing a channel between the source electrode 8 and the drain electrode 10 with the aid of a gate voltage applied to the gate electrode 12. Such a TFT 6 responds to a gate signal from the gate line 4 to selectively apply a data signal from the data line 2 to the pixel electrode 14. The pixel electrode 14 is formed at a cell area divided by the data line 2 and the gate line 4, and comprises an electrode made from an indium tin oxide (ITO) material having a high light transmissivity. This pixel electrode 14 generates a potential difference from a transparent electrode (not shown) formed on an upper glass substrate by a data signal applied via the drain contact 11. At this time, the liquid crystal is rotated by its dielectric anisotrophic property to transmit a light supplied, via the pixel electrode 14, from a light source toward the upper substrate. The auxiliary electrode line 16 generates a potential difference from the pixel electrode 14 in a scanning interval when a data signal is applied to the liquid crystal cell to adjust an orientation of the liquid crystal, thereby forming a multi-domain. In this case, a common voltage Vcom is applied from an external common voltage generator to the auxiliary electrode line 16. A boundary line 15 of a matrix formed on the upper substrate is located on the auxiliary electrode line 16 in such a manner that the matrix covers all portions of the auxiliary electrode line 16.

Figure 3:
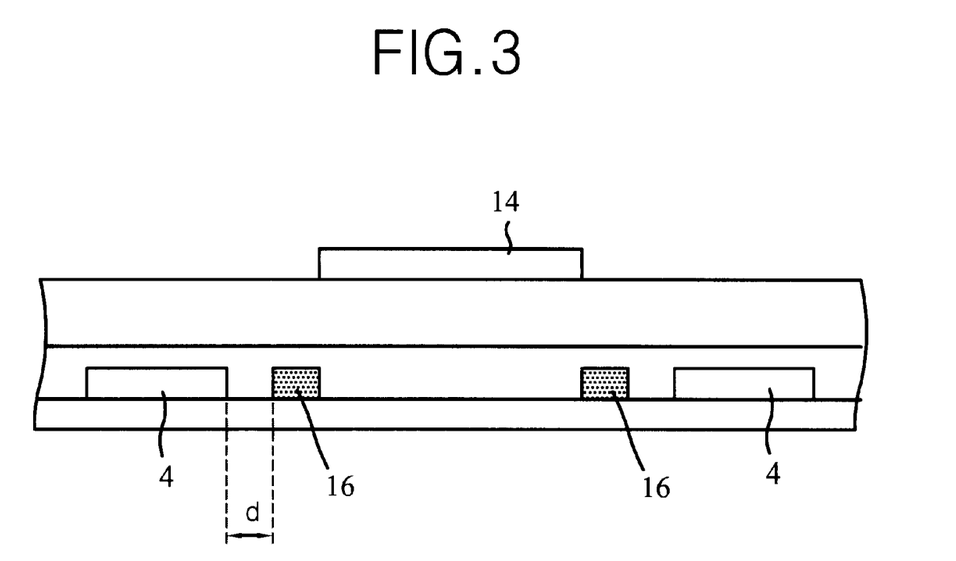
FIG. 3 is a section view of the multi-domain liquid crystal display device taken along A–A' line in FIG. 2.

In the above-mentioned LCD device, however, because the auxiliary electrode lines 16 taking a shape of surrounding the circumference of the pixel electrode 28 are used likewise, an aperture ratio proportional to a size of the pixel electrode 14 is reduced. Accordingly, a brightness of the LCD device is deteriorated. The auxiliary electrode lines 16 are usually formed on the same layer as the gate lines 4 as shown in FIG. 3. In this case, the gate lines 4 are liable to be shorted to the auxiliary electrode lines 16, and a line coupling in the data direction is generated, if shorted. In order to overcome this problem, it is necessary to assure a sufficient distance d between the gate line 4 and the auxiliary electrode 16. Accordingly, a size of the pixel electrode 14 goes smaller to further reduce an aperture ratio. In addition, the auxiliary electrode line 16 has a drawback in that, since it is formed in a line type and its width is set to have a value as small as possible (e.g., 6 μm) in consideration of an aperture ratio, that is, a size of the pixel electrode line 14, it has a large resistance value. As a resistance value of the auxiliary electrode line 16 is large, a voltage deviation caused by a resistance component thereof increases at the auxiliary electrode line 16 when applied to a large-dimension panel. Particularly, a common voltage is applied to the accompanying electrode line 16 from each side of the panel, and a resistance value of the auxiliary electrode line 16 is more and more increased to enlarge a voltage deviation as it goes toward the innermost side of the panel. Accordingly, as a potential difference between the pixel electrode 14 and the auxiliary electrode line 16 is differentiated for each liquid crystal cell, the brightness becomes non-uniform and a flicker and a residual image, etc. are generated to thereby cause a deterioration of picture.

SUMMARY OF THE INVENTION

Accordingly, it is an object of the present invention to provide a multi-domain liquid crystal display device wherein gate lines are used as auxiliary electrodes to improve an aperture ratio and a method of fabricating the same.

A further object of the present invention is to provide a multi-domain liquid crystal display device that is capable of preventing a short generation between data lines or gate lines and auxiliary electrode lines by using the gate lines as the auxiliary electrodes.

A still further object of the present invention is to provide a multi-domain liquid crystal display device that is capable of reducing resistance of auxiliary electrode lines to overcome problems such as the brightness non-uniformity, a flicker and a residual image, etc. by using gate lines as auxiliary electrode lines.

In order to achieve these and other objects of the invention, a multi-domain liquid crystal display device according to the present invention includes data lines for applying a data signal; gate lines crossing the data lines to apply a gate signal; pixel electrodes for driving a liquid crystal; switching devices arranged at each intersection between the gate lines and the data lines and connected to the pixel electrodes; and auxiliary electrode lines extended vertically from the gate lines to control an orientation of the liquid crystal along with the gate lines.

BRIEF DESCRIPTION OF THE DRAWINGS

These and other objects of the invention will be apparent from the following detailed description of the embodiments of the present invention with reference to the accompanying drawings, in which.

DETAILED DESCRIPTION OF THE PREFERRED EMBODIMENT

Figure 4:
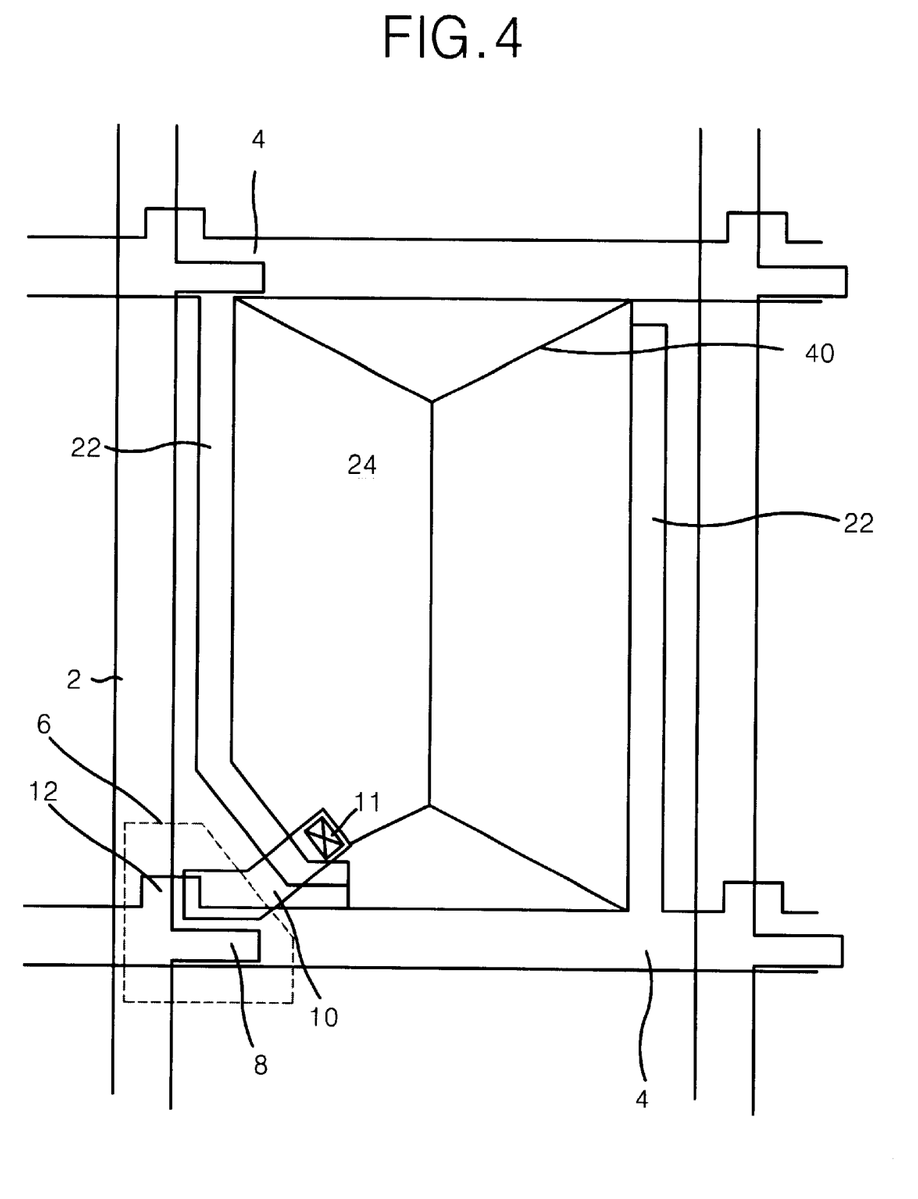
FIG. 4 is a plan view showing a structure of a multi-domain liquid crystal display device according to the present invention.

Referring to FIG. 4, there is shown a multi-domain liquid crystal display (LCD) device according to an embodiment of the present invention. The multi-domain LCD device of FIG. 4 includes the auxiliary electrode lines 16 having a line shape independent from the gate line 4 while the multi-domain LCD device of FIG. 4 includes auxiliary electrode lines extended from the gate lines 4.

Figure 5:
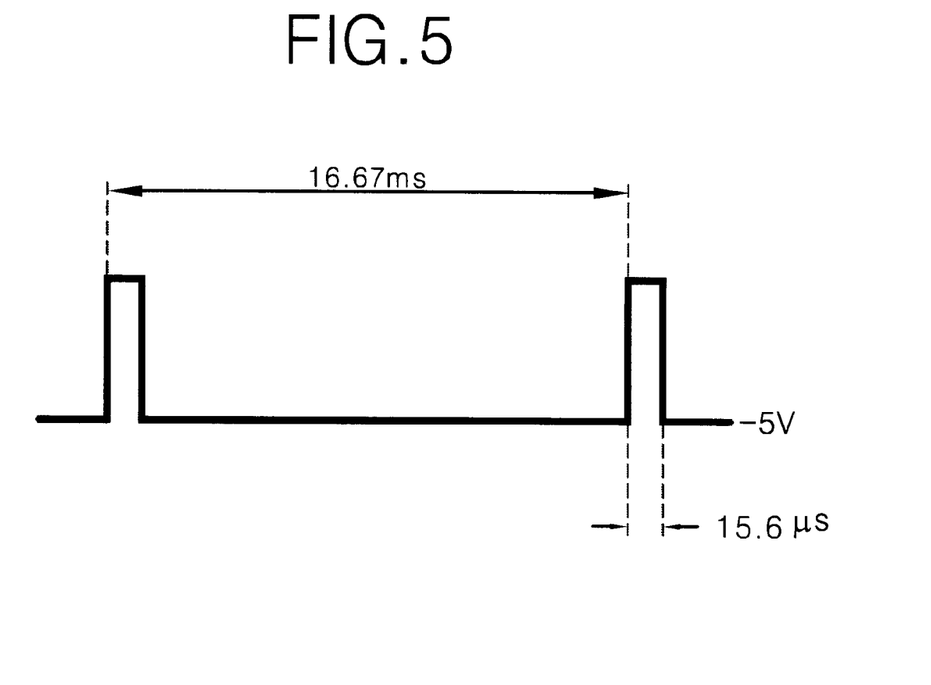
FIG. 5 is a waveform diagram of a signal applied to the gate line shown in FIG. 4.
Figure 6A:
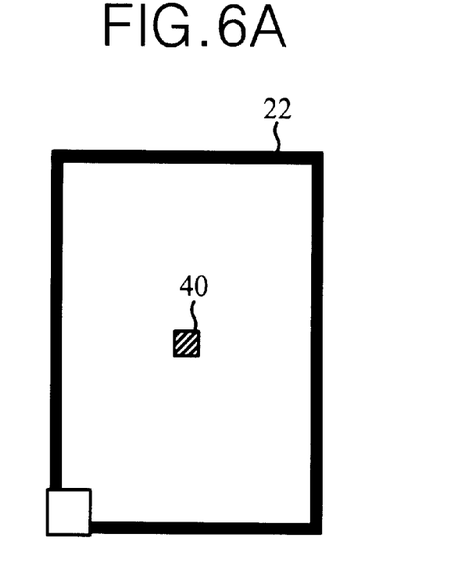
FIG. 6A to FIG. 6G illustrate various shapes of a slit or a dielectric structure applicable to a pixel area for a multi-domain implementation.
Figure 6B:
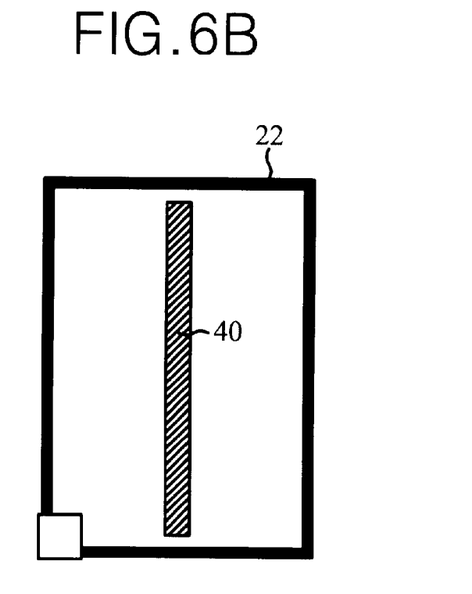
Figure 6C:
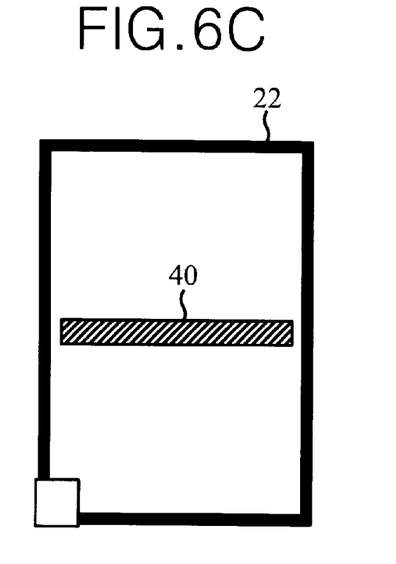
Figure 6D:
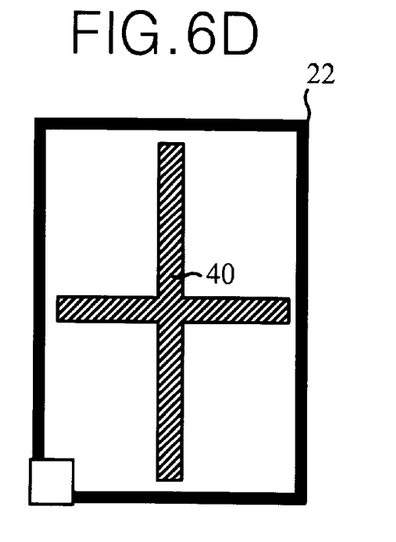
Figure 6E:
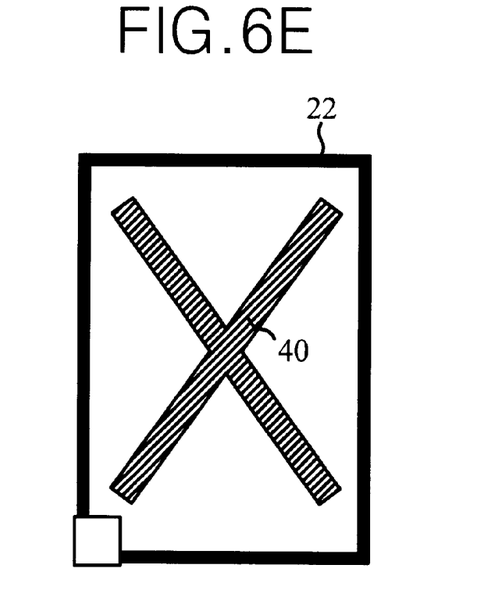
Figure 6F:
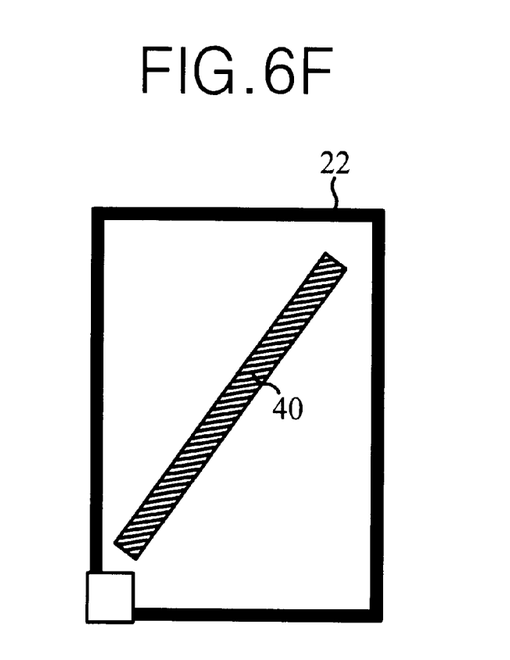
Figure 6G:
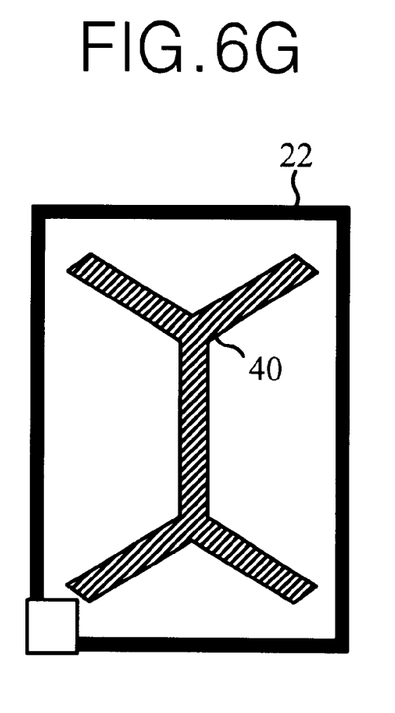

In FIG. 4, a thin film transistor (TFT) 6 arranged at each intersection between data lines 2 and gate lines 4 responds to a gate signal from the gate line 4 to selectively apply a data signal from the data line 2. The TFT 6 comprises a gate electrode 12 connected to the gate line 4, a source electrode 8 connected to the data line 2, and a drain electrode 10 connected, via a drain contact 11, to a pixel electrode 24. The TFT 6 further includes a semiconductor (not shown) for providing a channel between the source electrode 8 and the drain electrode 10 with the aid of a gate voltage applied to the gate electrode 12. The pixel electrode 24 is positioned at a cell area divided by the data line 2 and the gate line 4, and consists of an electrode made from an indium tin oxide (ITO) material having a high light transmissivity. This pixel electrode 24 generates a potential difference from a transparent electrode (not shown) formed on an upper substrate by a data signal applied via the drain contact 11. The auxiliary electrode lines 22 is extended from the gate line 4 in the vertical direction, that is, toward the upper portion and the lower portion, and is formed between the data line 2 and the pixel electrode 24. The auxiliary electrode line 22 adjusts an orientation of the liquid crystal cells by a potential difference from the pixel electrode 24 along with the gate line 4 at the circumference of the pixel electrode 24. In this case, the auxiliary electrode line 22 takes advantage of a gate signal applied to the gate line 4 to form a multi-domain. This is possible because a gate low voltage Vgl is applied to the gate line 4 during the majority of one frame interval (e.g., 16.67 ms) as shown in FIG. 5. A high level gate voltage Vg (e.g., 20V) applied once for each gate line 4 in one frame interval (i.e., 16.67 ms) is applied only during a 1/1000 interval (e.g., 15.6 µs) of one frame to make almost no affect to an multi-domain implementation.

Hereinafter, a method of fabricating the multi-domain LCD device according to the present invention having the configuration as mentioned above will be described step by step. First, the TFT 6 comprising the gate electrode 12, a gate insulating film, a semiconductor layer, an ohmic contact layer and source/drain electrodes 8 and 10 is provided at each pixel area of the first substrate. At this time, a plurality of gate lines 4, data lines 2 and auxiliary electrode lines 22 are provided. More specifically, the gate electrode 12 and the gate line 4 are provided by depositing any one metal of Al, Mo, Cr, Ta and Al alloy or a metal comprising a double layer of said metals by the sputtering method and thereafter patterning it. At the same time, the auxiliary electrode line 22 is formed by opening the gate line portion 4. Herein, the auxiliary electrode line 22 is formed at the same layer as the gate line 4 by the same mask when it is made from the same material as the gate line 4 to be electrically connected to the common electrode at the upper portion thereof. Otherwise, the auxiliary electrode line 22 may be formed of a metal different from the gate line by an additional mask, or may be formed into a double layer using a different metal material. The gate insulating film is provided thereon by depositing $SiN_x$ or $SiO_x$ by the plasma enhanced chemical vapor deposition (PECVD) method and thereafter patterning the same. Subsequently, the semiconductor layer and the ohmic contact layer are provided by individually depositing a-Si and $n^+$ a-Si by the PECVD method and thereafter patterning the same. Alternatively, the semiconductor layer and the ohmic contact layer may be provided by continuously depositing a-Si and $n^+$ a-Si by the PECVD method to form the gate insulation film and thereafter patterning the same. The data line 2 and the source/drain electrodes 8 and 10 are provided by disposing a metal such as Al, Mo, Cr, Ta and Al alloy, etc. by the sputtering method and thereafter patterning the same.

Next, the pixel electrode 24 is provided by forming the protective film from a material such as benzocyclobutene (BCB), acrylic resin, polyimide compound, $SiN_x$ or $SiO_x$, etc. over the entire first substrate and thereafter disposing an ITO material by the sputtering and then patterning the same. The black matrix is formed on the second substrate prepared separately, and the color filter layer is provided in such a manner that red(R), green(G) and blue(B) devices are repeated for each pixel. A dielectric structure 40 with various shapes as shown in FIGS. 6A to 6G is provided by disposing a photosensitive material on the color filter layer and then patterning the same by the photolithography. Patterning a common electrode on the second substrate to be formed later besides the dielectric structure may provide an opened area of the common electrode, that is, a slit. Their shapes are determined by the shapes of the dielectric structure 40 shown in FIGS. 6A to 6G. Subsequently, the common electrode is formed into a transparent electrode using a material such as ITO, etc. in similarity to the pixel electrode 24. Finally, a multi-domain LCD device is completed by injecting a liquid crystal between the first substrate and the second substrate. In this case, a liquid crystal having a positive or negative anisotropy is used for the liquid crystal making a liquid crystal layer, which may include a chiral dopant. It is desirable that a material making the dielectric structure has a dielectric constant (e.g., less than 3) equal to or smaller than the liquid crystal layer. Photoacrylate or BCB, etc. may be used for a material of the dielectric structure. The dielectric structure may be formed on the common electrode.

In the multi-domain LCD device according to the present invention, a polymer is expanded on at least one of the first and second substrates to form a phase-differential film. The phase-differential film is a negative uniaxial film made from a uniaxial material having a single light axis, which plays a role to compensate for a user's viewing direction from a direction perpendicular to the substrate and a direction according to a change in a view angle. Accordingly, it becomes possible to compensate for left and right view angles more effectively by widening an area with no gray inversion and heightening a contrast ratio in an inclined direction and by forming a single pixel into a multi-domain. A negative biaxial film other than such a negative uniaxial film may be used for the phase-differential film. The negative biaxial film made from a biaxial film having two light axes is able to obtain a wider view angle in comparison to the uniaxial film. After the phase-differential film was attached, a polarizer is attached onto the first and second substrates. In this case, the polarizer can be attached by forming integrally to the phase-differential film.

As described above, the multi-domain LCD according to the present invention is capable of enlarging a size of the pixel electrode 24 by using the gate line 4 and a protruded line part 22 extended from the gate line 4 as the auxiliary electrode line. Also, it can prevent a generation of a line defect caused by a short between the auxiliary electrode line formed in an independent line type to be coupled with a separate common voltage Vcom and the data line or the gate line. In addition, since the auxiliary electrode line 22 takes advantage of a gate low voltage Vgl applied to the gate line 4 to form a multi-domain, a separate common voltage source is not required. A resistance component of the auxiliary electrode line can be reduced by using the gate line 4 having a relatively larger width (e.g., 20 µm) than the conventional auxiliary electrode line as the auxiliary electrode line. A voltage deviation in the auxiliary electrode line is reduced owing to a reduction in such a resistance component, so that problems of the brightness non-uniformity and the generation of a flicker and residual image, etc. can be improved.

As described above, according to the present invention, the gate line is used as the auxiliary electrode line to increase a size of the pixel electrode and thus improve an aperture ratio. Accordingly, the brightness of the liquid crystal display device can be improved. Also, a generation of a line defect caused by a short between the auxiliary electrode line and the data line or the gate line can be prevented. In addition, since a gate low voltage Vgl applied to the gate line 4 is used to form a multi-domain, a separate common voltage source is not required. Moreover, using the gate line 4 having a relatively larger width as the auxiliary electrode line can reduce a resistance component of the auxiliary electrode line. As a result, a voltage deviation in the auxiliary electrode line is reduced, so those problems of the brightness non-uniformity and the generation of a flicker and residual image, etc. can be improved.

Although the present invention has been explained by the embodiments shown in the drawings described above, it should be understood to the ordinary skilled person in the art that the invention is not limited to the embodiments, but rather that various changes or modifications thereof are possible without departing from the spirit of the invention. Accordingly, the scope of the invention shall be determined only by the appended claims and their equivalents.

What is claimed is:

1. A multi-domain liquid crystal display device, comprising:

first and second substrates;

a liquid crystal layer between the first and second substrates;

data lines for applying a data signal on the first substrate;

gate lines crossing the data lines to apply a gate signal;

pixel electrodes for driving a liquid crystal of the liquid crystal layer;

switching devices arranged at each intersection between the gate lines and the data lines; and auxiliary electrode lines electrically connected to the gate lines and extended vertically from the gate lines to control an orientation of the liquid crystal in accordance with electrical potential on the gate lines, wherein the auxiliary electrode lines are formed in the same layer as the gate lines.

2. The device according to claim 1, wherein the auxiliary electrode lines are formed between the pixel electrode and the data line at the outside of the pixel electrode.

3. The device according to claim 1, further comprising a common electrode on the second substrate.

4. The device according to claim 3, wherein the common electrode includes an opening area.

5. The device according to claim 1, further comprising an dielectric structure on the second substrate.

6. A multi-domain liquid crystal display device, comprising:

data lines for applying a data signal on a first substrate;

gate lines crossing the data lines to apply a gate signal;

common electrode on a second substrate;

a liquid crystal layer between the first and second substrates;

pixel electrodes for driving a liquid crystal of the liquid crystal layer;

switching devices arranged at each intersection between the gate lines and the data lines; and auxiliary electrode lines electrically connected to the gate lines and extended vertically from the gate lines to control an orientation of the liquid crystal in accordance with electrical potential on the gate lines, wherein the auxiliary electrode lines are formed in the same layer as the gate lines.

7. The device according to claim 6, wherein the liquid crystal layer includes a positive anisotropy.

8. The device according to claim 6, wherein the liquid crystal layer includes a negative anisotropy.

9. The device according to claim 6, wherein the liquid crystal layer includes chiral dopants.

10. The device according to claim 6, further comprising a phase-differential film on at least one of the first and second substrates.

11. The device according to claim 10, wherein the phase-differential film includes a negative uniaxial film.

12. The device according to claim 10, wherein the phase-differential film includes a negative biaxial film.

13. The device according to claim 6, further comprising a dielectric structure on the second substrate.

14. The device according to claim 6, further comprising an opening area in the common electrode.

15. A method for fabricating a multi-domain liquid crystal display device comprising the steps of:

forming a liquid crystal layer between a first and second substrates;

forming data lines for applying a data signal on the first substrate;

forming gate lines crossing the data lines to apply a gate signal;

forming pixel electrodes for driving a liquid crystal of the liquid crystal layer;

forming switching devices arranged at each intersection between the gate lines and the data lines; and forming auxiliary electrode lines electrically connected to the gate lines and extended vertically from the gate lines to control an orientation of the liquid crystal in accordance with electrical potential on the gate lines, wherein the auxiliary electrode lines are formed in the same layer as the gate lines.

16. The method according to claim 15, further comprising the steps of forming a dielectric structure on the second substrate.

17. The method according to claim 16, further comprising the steps of forming a dielectric structure on the second substrate.

18. The method according to claim 16, further comprising the steps of forming an opening area in the common electrode.

19. The method according to claim 15, further comprising the steps of forming a common electrode on the second substrate.

20. The method according to claim 19, further comprising the steps of forming an opening area in the common electrode.

21. A method for fabricating a multi-domain liquid crystal display device comprising the steps of:

forming data lines for applying a data signal on a first substrate;

forming gate lines crossing the data lines to apply a gate signal on the first substrate;

forming common electrode on a second substrate;

forming a liquid crystal layer between the first and second substrates;

forming pixel electrodes for driving a liquid crystal of the liquid crystal layer;

forming switching devices at each intersection between the gate lines and the data lines; and forming auxiliary electrode lines electrically connected to the gate lines and extended vertically from the gate lines to control an orientation of the liquid crystal in accordance with electrical potential on the gate lines, wherein the auxiliary electrode lines being formed in the same layer as the gate lines.

* * * * *